Feb. 8, 1955   S. P. HIGGINS, JR   2,701,576
AIR-OPERATED MANUALLY OR AUTOMATICALLY SET CONTROLLER
Filed Oct. 29, 1949   2 Sheets-Sheet 2

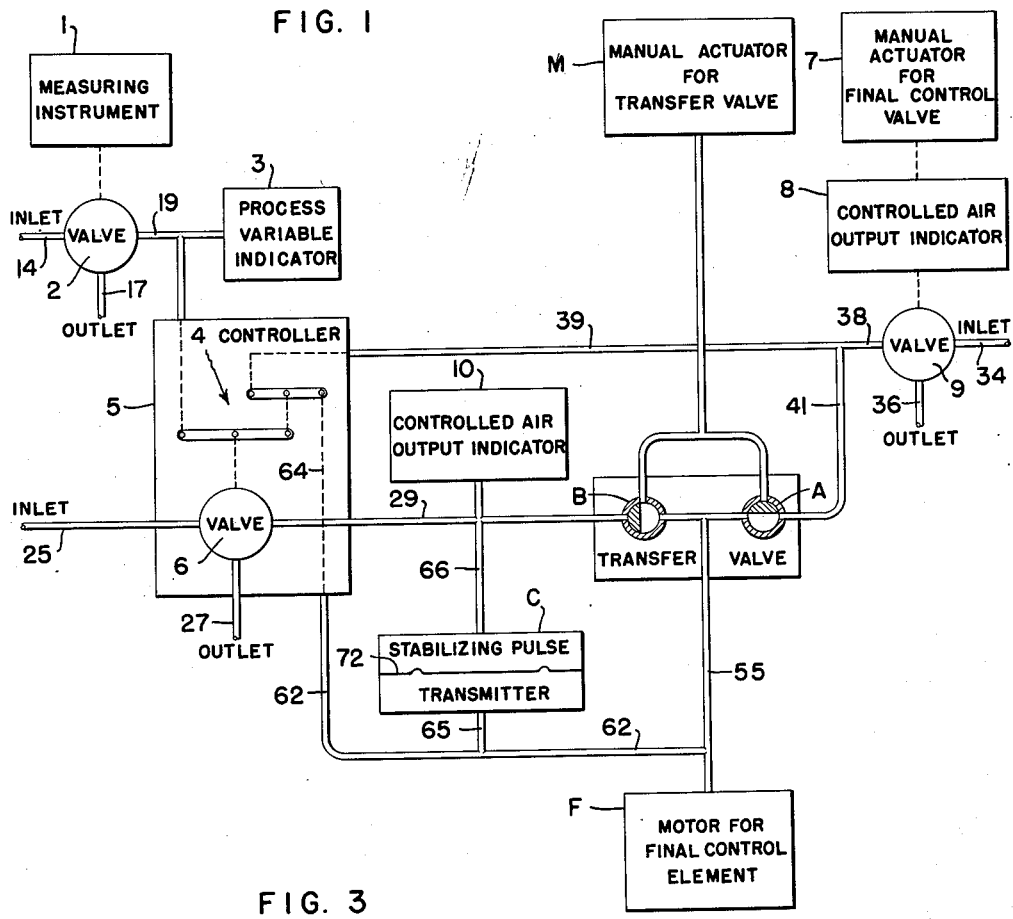
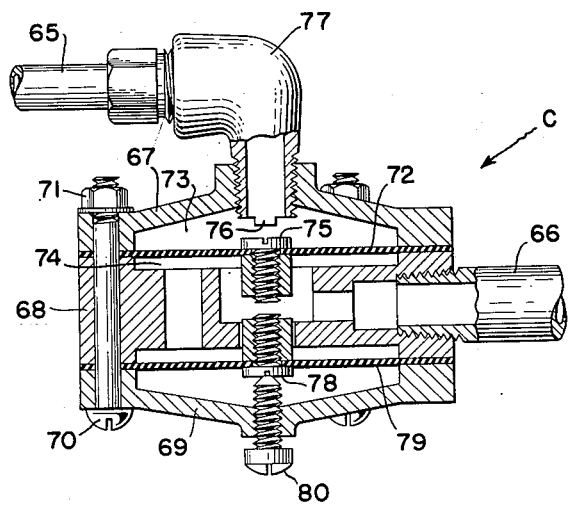

| TABLE OF VALVE POSITIONS | | |
|---|---|---|
| VALVE | | |
| TRANSFER | A | B |
| MANUAL | OPEN | CLOSED |
| HOLD | CLOSED | CLOSED |
| AUTOMATIC | CLOSED | OPEN |

*INVENTOR.*
STEPHEN P. HIGGINS JR.
BY *Arthur H. Swanson*
ATTORNEY.

United States Patent Office

2,701,576
Patented Feb. 8, 1955

2,701,576

**AIR-OPERATED MANUALLY OR AUTOMATI-
CALLY SET CONTROLLER**

Stephen P. Higgins, Jr., Philadelphia, Pa., assignor to
Minneapolis-Honeywell Regulator Company, Minne-
apolis, Minn., a corporation of Delaware Application October 29, 1949, Serial No. 124,469

9 Claims. (Cl. 137—84)

This invention relates to a controller composed of four main elements. I. A final control element for adjusting a control agent which supplies energy or material to a process. II. An automatically operable element which automatically controls the final control element. This automatically operable element includes two members. (a) A measuring portion comprising an instrument which measures that variable of the process which is to exercise the control. (b) A controller portion operated by said measuring instrument so as to produce an output pressure which has a first variation in one direction or the other depending upon the variations sensed by said measuring instrument in the variable which exercises the control. This controller portion also has a second or "follow-up" variation in the opposite direction to said first variation and a third or "compensating" variation in the same direction as said first variation. III. A manually operable element which provides means for manually actuating the final control element, so as to selectively vary the control agent supplied to the process. IV. A manually operable transfer element for connecting the final control element selectively under the control of the measuring instrument or of the manually operable instrument.

In controllers of this type, it is often desirable to have the manual control at some distance from the final control element and to provide a controller at the final control element, which controller is actuated with a primary or control impulse, a secondary or reversely operating follow-up impulse, and a tertiary or directly acting reset impulse. In such controllers, the transfer instrument is usually provided with three positions; namely, Manual, Hold, and Automatic. In the Hold position, the controller is adjusted until the air pressure about to be applied to the final control element is approximately equal to the air pressure existing at or already applied to the final control element. Consequently, the pressure which is newly applied to the final control element does not change the position of that element and therefore does not upset the process controlled by the final control element.

It has been found that the apparatus known prior to this invention in shifting from the Manual to Automatic position and adjusting the output pressure of the controller, which is the pressure about to be applied to the final control element, the controller acts with a simple on-off mode of operation so that the pressure applied to the final control element may be completely spilled or reduced to that of the atmosphere or raised to that of the supply pressure, thus making it exceedingly difficult to equalize the pressure about to be applied to the final control element with that already existing in the final control element.

A primary feature of this invention, therefore, consists in the provision and association with the controller of a pressure transmitting device exposed, on its opposite sides, to the pressure applied to the final control element and to the pressure about to be applied to the final control element. This arrangement introduces a stabilizing follow-up action into the operation of the controller and permits the pressure about to be applied to the final control element readily to be equalized with that already existing in the final control element.

A further object of this invention is to provide a pressure transmitting device comprising a case divided into two chambers by a flexible diaphragm, ports communicating with the chambers on opposite sides of said diaphragm, and stops for limiting the movement of said diaphragm in either direction.

Various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described the preferred embodiment of the invention.

Of the drawings:

Fig. 1 is a block diagram;

Fig. 3 is a transverse cross section through the pulse transmitter; and

Figures 2, 4:
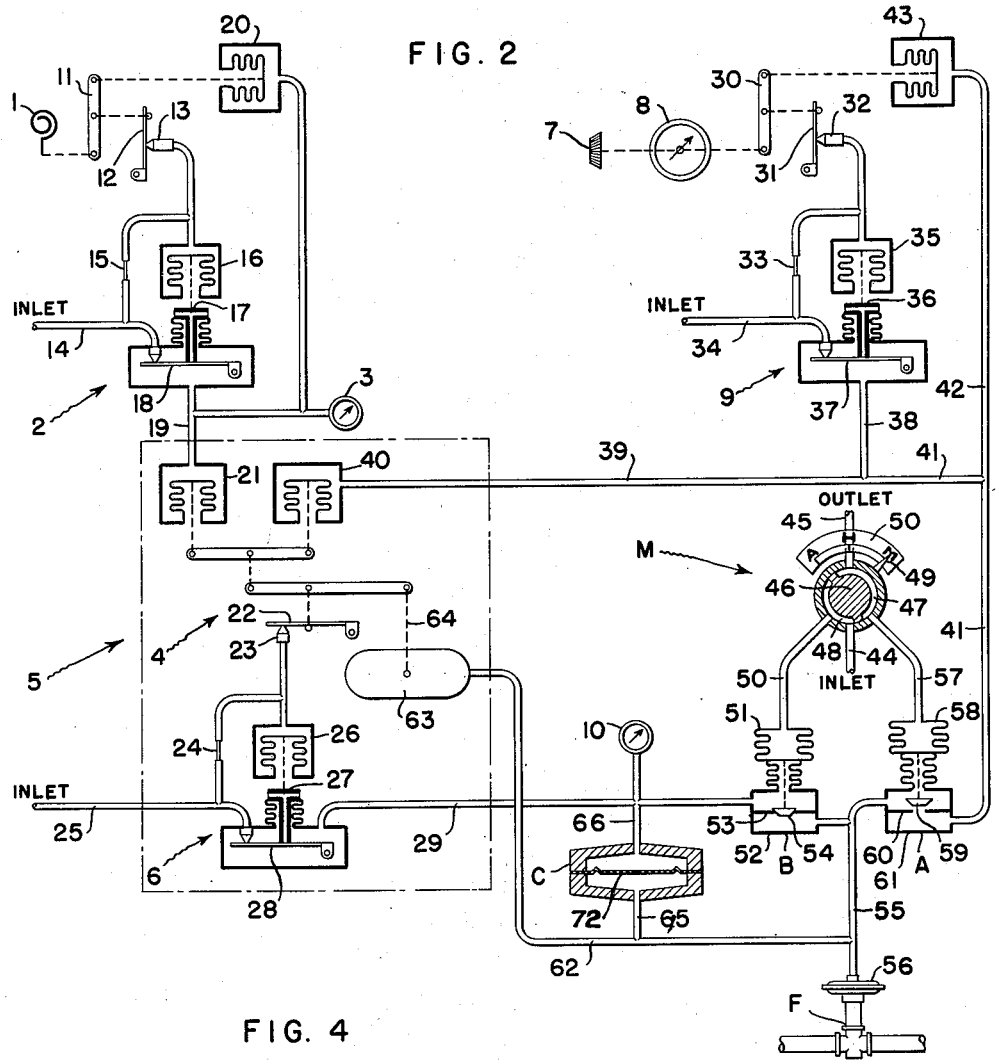
Fig. 2 is a schematic diagram with the elements shown in symbolic form.
Fig. 4 is a table showing the relative positions of three of the valves forming part of the transfer element.

Fig. 1 shows the measuring element referred to above as part II of the controller. The measuring element consists of the measuring instrument 1 which may be any device for measuring a controlled variable affecting an industrial process. Examples of such control variables are temperature, pressure, fluid flow, liquid level, humidity, hydrogen ion concentration and the like. The measuring instrument 1 is adjusted to control a pilot or relay valve 2 by means of which compressed air from an inlet is admitted to or exhausted from an air-operated transmitting device. A gauge 3 indicates the pressure within the transmission device and hence indicates, by proper calibration, the instantaneous value of the variable affecting the measuring instrument. The output of the air-operated transmitting system is connected to a differential, generally indicated at 4, forming part of the air-operated controller, generally indicated at 5, and including a pilot or relay valve 6 adjusted to admit or exhaust compressed air from a second, air-operated transmitting device.

The transfer element referred to above as part IV of the controller comprises a manual actuator M for the transfer valve. This manual actuator comprises a manually operable valve, shown in greater detail in Fig. 2. This valve admits air to or exhausts air from a pair of air-operated motors for a pair of valves A and B which transfer the control of the final control element from the measuring instrument to the manual instrument or vice versa.

The final control element referred to above as part I of the controller is shown in Fig. 1 at F. This final control element may conveniently be a valve or circuit-maker-and-breaker or rheostat controlling the supply of a control agent, such as steam, fuel, electricity, or the like, to the process under control. This valve is conveniently moved by an air-operated diaphragm motor of known construction.

The manual instrument referred to above as part III of the controller is shown in Fig. 1 as comprising a manual actuator 7 for the final control element F. An indicator 8, which may be simply a pointer attached to the actuator and cooperating with a scale, indicates the value of the air pressure set up by the manual actuator 7 in a third pilot or relay valve 9. The outlet air from pilot 9 passes to transfer valve A and also forms a second input to differential of controller 5.

The stabilizing pulse transmitter C, which forms the principal feature of this invention, is connected so that one side of the diaphragm therein is exposed to the pressure in the final control element F while the other side is exposed to the output pressure from pilot 6 to the transfer valve B which is also measured by gauge 10 forming a controlled air output indicator.

Fig. 2 shows this controller in greater detail. Measuring element 1 forms one input to a differential 11 whose output controls a flapper 12 cooperating with a nozzle 13 connected, through a restriction 15, to the inlet 14 which feeds pilot 2 and to a bellows motor 16, mechanically connected to the outlet or exhaust valve 17 of the pilot 2. Flapper 18 controls the admission of air from the inlet 14 or the exhaust of air through the outlet 17 of pilot 2. Outlet pipe 19 conducts air from pilot 2 to a gauge 3, which forms a process variable indicator, and also to bellows motor 20, which forms a second input to differential 11 and thus restricts flapper 12.

Output air from pipe 19 also passes to bellows motor 21, which forms one input to differential 4 of controller 5. The output of differential 4 controls flapper 22 which cooperates with nozzle 23. Nozzle 23 is connected through restriction 24 with inlet 25 which also provides air for the inlet nozzle of pilot or relay 6. Nozzle 23 is connected to bellows motor 26, which has a mechanical connection with outlet or exhaust nozzle 27 of pilot 6. Flapper 28 controls the inlet and exhaust of air from pilot 6. Pipe 29 conducts the output air from pilot 6 to transfer valve B, to gauge 10, which forms a controlled air output indicator, and to stabilizing pulse transmitter C.

The manual element (III) comprises a manually operable knob 7, forming a manual actuator valve. Controlled air output indicator 8 may simply be a pointer attached to or rotated by knob 7 and cooperating with a suitable scale. The movement of knob 7 forms one input to a differential 30 whose output controls a flapper 31 cooperating with nozzle 32 which is connected through a restriction 33 to inlet 34 to pilot 9. Nozzle 32 is also connected to bellows motor 35 which has mechanical connection with outlet or exhaust valve 36. Flapper 37 controls the inlet of air through nozzle 34 or the exhaust of air through outlet 36 from pilot 9. Pipe 38 conducts the output air from pilot 9 to pipe 39 which connects with bellows motor 40 forming a second input to differential 4 of controller 5. Pipe 41 leads from pipe 38 and has a branch 42 which connects to bellows motor 43, which forms a second input to differential 30. Pipe 41 conducts the air from pilot 9, as manually controlled by knob 7, to transfer valve A.

The transfer mechanism referred to above as part (IV) of the controller comprises a manually operable valve, generally indicated at M. A plug valve 46 has an inlet 44, an outlet 45, and two conduits 47 and 48 through it, as well as a pointer 49 which cooperates with a scale 50. This cooperation indicates which of its three positions Manual, Hold, or Automatic, the transfer valve is in. Fig. 2 shows the valve M in the Manual position. Air from inlet 44 passes through conduit 48 to pipe 50 which connects with bellows motor 51 of the transfer valve, generally indicated at B. Valve B consists of a casing 52 divided into two compartments by a partition 53 having an orifice forming a valve seat in it. Valve 54 is moved to open or close this orifice by motor 51. Air from pilot 6 passes through pipe 29 to the upper chamber of valve B, whence it is conducted to one branch of pipe 55 which connects to the diaphragm, air-operated motor 56 of the final control element F. Simultaneously, air exhausts through outlet 45, conduit 47, and pipe 57 from bellows motor 58 which has mechanical connection with valve 59. Valve 59 cooperates with an orifice forming an opening or valve seat in partition 60 which divides the casing 61 of transfer valve A into two compartments. Pipe 41 leads air from pilot 9 to the lower of these compartments while a second branch of pipe 55 conducts the air from the upper of these compartments to the motor 56.

Pipe 62 connects with pipe 55 at one end and with device 63 at the other. Device 63 forms part of controller 5 and is a means for applying a second or "follow-up" adjustment and a third or "compensating" adjustment to the flapper 22 of the controller 5. Device 63 is not specifically disclosed herein, as the details of this device are completely disclosed in U. S. Patent 2,125,081 to Coleman B. Moore, and are in wide commercial use. The output from device 63 passes by mechanical connection 64 to form one input of differential 4.

The stabilizing pulse transmitter C, which forms the principal feature of this invention, is connected on one side by pipe 65 to pipe 62. On the other side, pipe 66 connects transmitter C to pipe 29.

Fig. 3 shows the details of transmitter C. The transmitter has a hollow casing formed of top 67, a middle 68, and a bottom 69 which are secured together by bolts 70 and nuts 71. A diaphragm 72 of suitable flexible material is clamped between top 67 and middle 68 so as to divide the interior of the casing into chambers 73 and 74. Diaphragm 72 carries a screw 75 to limit upward movement of diaphragm by cooperation with a projection 76 which extends from the outer rim or surface of a nipple 77 to which pipe 65 is attached. A screw 78 is supported by a sealing diaphragm 79 in an adjusted position which is regulated by means of a set screw 80 which projects through bottom 69 so as to be adjustable from the exterior of the casing to limit downward movement of diaphragm 72.

Operation

The operation of the device of this invention is as follows: Assume that it is desired to transfer from the Manual to the Automatic position, that is to say, control of the final control element F is to be taken away from the manual knob 7 and transferred to the measuring instrument 1. The transfer valve M is first turned from Manual position, in which it is shown in Fig. 2, to the Automatic position. In doing this, the valve M passes through the Hold position in which both transfer valve A and transfer valve B are closed. Closure of transfer valves A and B means that air is trapped in pipe 55 between valves A and B, motor 56, device 63, and transmitter C. This is the air referred to above as the pressure already applied to the final control element. Likewise air is trapped in pipe 29 between pilot 6, transfer valve B, gauge 10, and transmitter C. This is the air referred to above as the air about to be applied to the final control element. In order to adjust the air pressure in pipe 29 to equal the air pressure in motor 56, knob 7 is turned so that its motion is transmitted through the air-operated transmitting device, as shown, to the bellows motor 40, which causes the differential 4 to adjust the set point of flapper 22 relative to nozzle 23. This adjusts the output pressure in pipe 29 by means of pilot 6. But this adjustment tends to be too coarse because it actuates pilot 6 with a simple on-off mode of operation and tends to spill or completely exhaust the air from pipe 29 or to build up the air pressure in pipe 29 to that of the air supply before change in pressure in pipe 29 is conducted to gauge 10 so as to show the operator at the remote position, at which the knob 7 is located, that the air in pipe 29 has been adjusted by the desired amount. To avoid this coarse or undesired operation of pilot 6, transmitter C is provided. As flapper 22 approaches the point to which it is set, a stabilizing follow-up pulse of short duration is transmitted from pipe 29, through diaphragm 72, device 63, and regulator 64 to differential 4. Flapper 22 is restrained long enough for gauge 10 to give an indication to the operator of knob 7 that the desired pressure has been reached so that knob 7 can be manipulated to accurately adjust the pressure in pipe 29 to match the pressure existing in pipes 55 and 62.

Summary

This invention provides means whereby an operator at a remote location can easily and accurately adjust the set point of a controller located adjacent a final control element.

While in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is:

1. An air-operated controller adjustable to set up an output air pressure, a manually-controlled air-operated regulator governing said controller so as to vary its output pressure, and an air-pressure-operated transmitter including a casing, a diaphragm dividing said casing into two chambers, a conduit connecting said output air pressure to one of said chambers, a conduit connecting the other of said chambers to the air pressure put out by said regulator and to said controller so as to prevent said regulator from changing said output air pressure in an on-off manner, and a stop projecting from said casing and adjustable to limit the movement of said diaphragm.

2. A fluid-pressure-operated controller mechanism providing a final output fluid pressure for operating a fluid-pressure-operated final control element, including in combination, an automatically operable element operative to set up a first fluid pressure in accordance with a controlled variable, a manually operated pressure regulator operable to set up a second fluid pressure, a transfer valve manually operable to connect said first fluid pressure to form the final output pressure and to disconnect said second fluid pressure from said final output pressure and from said automatically operable element and vice versa, and a fluid-pressure-operated transmitter connected to and operated by the said first fluid pressure and to and by the fluid pressure presently to form the final output pressure so as to transmit a pressure pulse of short duration to the pressure which presently forms the final output pressure and which is presently connected to the automatically operable element.

3. A fluid-pressure-operated controller providing a final output pressure for operating a fluid-pressure-operated final control element, including in combination, a fluid-pressure-operated control instrument operative to set up a first air pressure adjustable in accordance with a controlled variable, a manually operated pressure regulator operable to set up a second fluid pressure, a transfer valve manually operable to connect said first pressure to said final output pressure and to disconnect said second pressure from said final output pressure and from said control instrument and vice versa, and a transmitter connected to and operated by said first fluid pressure and to and by the fluid pressure which presently forms the final output pressure so as to transmit a pulse of fluid pressure of short duration from that pressure which is about to form the final output pressure to that pressure which presently forms the final output pressure and which is presently connected to said control instrument.

4. A fluid-pressure-operated controller mechanism providing a final output pressure for operating a fluid-pressure-operated final control element, including in combination, a measuring instrument responsive to a controlled variable of a process under control, a fluid-pressure-operated controller adjustable by said measuring instrument to set up a first output pressure, a manually operable fluid-pressure regulator adjustable to set up a second output pressure, a manually operable transfer valve for shifting from said controller to said regulator er vice versa so that said first or said second output pressure becomes the final output pressure, a fluid-pressure-operated transmitter for conducting a pulse of short duration from said first output pressure to said controller so as to vary the output pressure of said controller in the reverse direction from which it is being varied by said regulator, a movable element forming part of said transmitter and movable in response to said first and to said second output pressures, a first conduit connecting said first output pressure to one side of said movable element, and a second conduit connecting said second output pressure to the other side of said movable element.

5. A fluid-pressure-operated controller having a flapper movable first in one direction or the other, a manually-operated fluid-powered regulator connected to adjust said flapper in the first direction, and a hollow casing divided into two enclosed compartments by a diaphragm, one side of said diaphragm being exposed to the fluid pressure under the control of said regulator and the opposite side of said diaphragm being exposed to the fluid pressure forming the output of said controller so that, upon movement of said regulator, a fluid-pressure pulse of short duration is transmitted from said output pressure through the pressure under the control of said regulator to the controller so as to adjust the controller in the opposite direction to its first movement to prevent the controller from operating in an on-off manner.

6. A fluid-pressure-operated controller having a flapper movable to vary the output pressure of said controller, an output conduit from said controller, a transfer valve controlling the opening and closing of said output conduit and having a second output pressure when said output conduit is closed, a connection from the output side of said transfer valve having connection with said flapper so as to move it in the opposite direction, a fluid-pressure-transmitter connected between said output conduit and said connection to said flapper so as to transmit changes of pressure in said output conduit to said flapper to move said flapper in the opposite direction, and a movable element in said transmitter and movable simultaneously in response to said output pressure of said controller and to said second output pressure.

7. A fluid-pressure-operated controller having a final output pressure for operating a fluid-pressure-operated final control element, a fluid-pressure-operated automatically operable element operative to adjust said controller to set up a first fluid pressure adjustable in accordance with a control variable, manually operated pressure regulator operable to set up a second fluid pressure, a transfer valve manually operable to connect said first pressure to the final output pressure and to disconnect said second fluid pressure from the final output pressure and vice versa, and a pressure-operated transmitter including a casing, a diaphragm dividing the casing into two chambers, a conduit connecting said first fluid pressure to one of said chambers, a conduit connecting the other of said chambers to said second fluid pressure and to said controller so as to prevent said second fluid pressure from changing said first fluid pressure in an on-off manner.

8. A fluid-pressure-operated controller movable first in one direction or the other to provide a first output fluid pressure and then movable in a second opposite direction to a lesser extent to prevent the controller from operating in an on-off manner, a manually controlled fluid-pressure-operated regulator providing a second output fluid pressure which is conducted to said controller so as to move it in the first direction, a manually operated transfer element for selecting that one of said first and said second output fluid pressures which is to form the final output pressure, and a fluid-pressure-conduit having an element movable in one direction in response to said output fluid pressure which is applied to the controller and movable in another direction in response to said first output fluid pressure so as to move the controller in the second direction.

9. A fluid-pressure-operated controller having a flapper adjustable first in one direction or the other in response to the variations in the measured variable so as to provide a first output fluid pressure, a manually controlled fluid-pressure-operated regulator providing a second output fluid pressure, a fluid-pressure-operated motor operated by said second output fluid pressure and connected to said flapper to adjust it in the first direction, a manually operable transmitter element for selecting that one of said first and of said second output fluid pressures which is to form the final output pressure, and a fluid-pressure-transmitter having an element movable in response to any difference between the pressure of said first output fluid pressure and the pressure of said second output fluid pressure so as to transmit a pulse of short duration and move said flapper in the opposite direction to prevent said controller from operating in an on-off manner.

References Cited in the file of this patent

UNITED STATES PATENTS

| Number | Name | Date |
|---|---|---|
| 2,369,887 | Eckman | Feb. 20, 1945 |
| 2,391,703 | Hughes | Dec. 25, 1945 |
| 2,476,104 | Mason | July 12, 1949 |
| 2,507,606 | McLeod | May 16, 1950 |
| 2,577,967 | Hughes | Dec. 11, 1951 |